(12) United States Patent
Hidai

(10) Patent No.: US 9,281,990 B2
(45) Date of Patent: Mar. 8, 2016

(54) ETHERNET UDP CHECKSUM COMPENSATION

(71) Applicant: JDS Uniphase Corporation, Milpitas, CA (US)

(72) Inventor: Takashi Hidai, Palo Alto, CA (US)

(73) Assignee: Viavi Solutions Inc., Milpitas, CA (US)

( * ) Notice: Subject to any disclaimer, the term of this patent is extended or adjusted under 35 U.S.C. 154(b) by 332 days.

(21) Appl. No.: 13/769,125

(22) Filed: Feb. 15, 2013

(65) Prior Publication Data

US 2013/0215908 A1    Aug. 22, 2013

Related U.S. Application Data

(60) Provisional application No. 61/600,511, filed on Feb. 17, 2012.

(51) Int. Cl.

| | |
|---|---|
| *H04L 29/06* | (2006.01) |
| *H04L 12/54* | (2013.01) |
| *H04L 12/931* | (2013.01) |
| *H04L 12/939* | (2013.01) |
| *H04N 7/24* | (2011.01) |
| *H04L 12/861* | (2013.01) |

(52) U.S. Cl.
CPC ...... *H04L 29/06122* (2013.01); *H04L 12/5601* (2013.01); *H04L 49/00* (2013.01); *H04L 49/557* (2013.01); *H04L 69/04* (2013.01); *H04L 69/164* (2013.01); *H04L 69/22* (2013.01); *H04L 49/90* (2013.01); *H04N 7/24* (2013.01)

(58) Field of Classification Search
CPC . H04L 69/164; H04L 29/06122; H04L 49/00; H04L 69/04; H04L 69/22; H04L 12/56

USPC ........................................ 370/392, 401, 476
See application file for complete search history.

(56) References Cited

U.S. PATENT DOCUMENTS

| | | | |
|---|---|---|---|
| 6,449,252 B1* | 9/2002 | Marsteiner | H04Q 11/0478 370/230 |
| 6,826,181 B1* | 11/2004 | Higashida | H04Q 11/0478 370/390 |
| 2002/0089987 A1* | 7/2002 | Sasaki | H04L 12/5601 370/395.2 |
| 2006/0153155 A1* | 7/2006 | Jacobsen | H04L 1/1829 370/338 |
| 2007/0211724 A1* | 9/2007 | Johansson | H04L 49/00 370/392 |

\* cited by examiner

*Primary Examiner* — Jae Y Lee
*Assistant Examiner* — Jean F Voltaire
(74) *Attorney, Agent, or Firm* — Harrity & Harrity, LLP

(57) ABSTRACT

In the methods and devices of the present disclosure, a dummy compensation word is added to the data packet such that the UDP checksum value need not be modified from any previous value, regardless of changes to the UDP payload. Because the UDP checksum value is not modified in embodiments of the present disclosure, there is no delay waiting for a UDP checksum value to be calculated and no need for additional buffers to store the data packet contents because of UDP checksum calculations. The dummy compensation word is calculated so that the unmodified value maintained in the checksum is the checksum for the data packet including the dummy compensation word. By placing the compensation word in the data packet after the last word in the UDP payload, there is no, or very minimal, processing delay and data packet buffering hardware is significantly reduced.

20 Claims, 6 Drawing Sheets

ETHERNET UDP CHECKSUM COMPENSATION

CROSS-REFERENCE TO RELATED APPLICATIONS

The present disclosure claims priority from U.S. Provisional Patent Application No. 61/600,511 filed Feb. 17, 2012, entitled "Ethernet UDP Checksum Compensation", which is incorporated herein by reference for all purposes.

TECHNICAL FIELD

The present disclosure relates to data packet checksums and more particularly to improvements in data packet checksum calculations to reduce the required hardware, power consumption and data packet processing time.

BACKGROUND OF THE INVENTION

FIG. 1 illustrates a conventional IP network data packet 100 comprising an IP header 102 including source and destination IP addresses 104, 106; a UDP header 108 including a length 111, a UDP checksum 110; and a UDP payload 112. Each of these data items comprises a series of digital information units, such as 16-bit words.

A conventional method of UDP checksum calculation will now be described. At the beginning, a 32-bit register is initialized with the protocol type, such as 0x11 for UDP. Then, the source IP address field 104 and destination IP address field 106 of the IP header 102 are added to the 32-bit register. Next some data from the UDP header data 108 is added omitting the checksum datum 110 but doubling the length datum (not illustrated in FIG. 1). Then each datum of the UDP payload 112 is added.

After parsing the data packet 100, the most significant 16 bits and the least significant 16 bits of the 32-bit register are added together and the 2's complement of the result (e.g. subtracting one from the result then applying bit inversion) is calculated to arrive at the UDP checksum value. Finally, this value is written into the UDP checksum 110 of the UDP header 108, for example at the 4th word.

An example of tabulating this checksum calculation is in Table 1 below. The calculation on that input data is a 16-bit word based addition in a 32-bit register:

TABLE 1

| Item Name | 16-bit Input | 32-bit Register |
|---|---|---|
| MAC header | ffff | 00000011 |
|  | ffff | 00000011 |
|  | ffff | 00000011 |
|  | 0024 | 00000011 |
|  | e89d | 00000011 |
|  | 453c | 00000011 |
|  | 0800 | 00000011 |
| IPv4 header | 4500 | 00000011 |
|  | 0044 | 00000011 |
|  | bd50 | 00000011 |
|  | 0000 | 00000011 |
|  | 8011 | 00000011 |
|  | 3bd5 | 00000011 |
| IP Source address | 0a4b | 00000a5c |
|  | 3739 | 00004195 |
| IP Destination address | ffff | 00014194 |
|  | ffff | 00024193 |
| UDP header | 0405 | 00024598 |
|  | 079b | 00024d33 |
| length | 0030 | 00024d93 |
| Checksum | 5576 | 00024d93 |

TABLE 1-continued

| Item Name | 16-bit Input | 32-bit Register |
|---|---|---|
| Payload | 4e56 | 00029be9 |
|  | 3550 | 0002d139 |
|  | 5444 | 0003257d |
|  | 4158 | 000366d5 |
|  | 4141 | 0003a816 |
|  | 424e | 0003ea64 |
|  | 5355 | 00043db9 |
|  | 784d | 0004b606 |
|  | 5644 | 00050c4a |
|  | 4643 | 0005528d |
|  | 4d31 | 00059fbe |
|  | 5a4f | 0005fa0d |
|  | 537a | 00064d87 |
|  | 4541 | 000692c8 |
|  | 6233 | 0006f4fb |
|  | 4a54 | 00073f4f |
|  | 6158 | 0007a0a7 |
|  | 5242 | 0007f2e9 |
|  | 6257 | 85540 |
|  | 5541 | 0008aa81 |

In table 1, the 32-bit register begins initialized with the value 0x11, which is the UDP protocol type value. A data processing window reads the data packet 100 one data unit at a time. In table 1 each data unit is 1 word expressed in hexadecimal notation. As the window proceeds word by word through the packet, the relevant data values are accumulated into the 32-bit register value. When the window reaches the length datum, it is added twice to account for the 16-bit size of each datum in the packet. When the window reaches the end of the UDP payload 112, the 32-bit register totals 0x0008AA81. The checksum is then calculated by adding the most significant word (0x0008) and the least significant word (0xAA81) of the 32-bit register and taking the 2's complement of that sum (0x5576). This value is the conventional checksum of the packet and is written into the checksum 110.

Because the processing window proceeds in a unit by unit sequence from the start of the data packet 100 to its end, if the value to be written to a unit is not know at the time it is in the processing window, transmission of any subsequent units must be delayed and any processing of subsequent units while waiting must be stored into a temporary memory buffer.

In a conventional checksum calculation, the checksum final value cannot be determined until the processing window has reached the end of the UDP payload 112. Accordingly temporary memory storage is required to buffer all data units between the UDP checksum 110 and the end of the UDP payload 112 for each data packet 110. The size of this temporary storage depends directly on the size of the UDP payload 112. Because the checksum value cannot be known until all UDP payload data has been processed, transmission of the packet 100 must be delayed from when the processing window reaches the UDP checksum 110 until the processing window reaches the end of the UDP payload 112.

When processing data packets 100 using the conventional method for calculating UDP checksum, a temporary storage (memory) or buffer may hold the entire data packet for the UDP checksum calculation increasing the gate count (memory) of the ASIC.

When real-time processing of data packets is required, the data processing should minimize or eliminate any delay that would prevent sequentially forwarding the packet unit-by-unit after processing unit-by-unit through the data processing window. As described above, this is not possible with conventional checksum calculations. Thus the delivery, transmission or forwarding of any subsequent units in the packet must be delayed until all of the UDP payload 112 has been processed. Providing a data-processing window that can read all of the UDP payload units in parallel requires ever increasing hardware resources and power consumption as the length of UDP payloads increase.

SUMMARY OF THE INVENTION

According to the present disclosure, a dummy compensation word is added to the data packet such that the UDP checksum value need not be modified from any previous value, regardless of changes to the UDP payload. Because the UDP checksum value is not modified in embodiments of the present disclosure, there is no delay waiting for a UDP checksum value to be calculated and no need for additional buffers to store the data packet contents because of UDP checksum calculations. The dummy compensation word is calculated so that the unmodified value maintained in the checksum is the checksum for the data packet including the dummy compensation word. By placing the compensation word in the data packet after the last word in the UDP payload, there is no, or very minimal, processing delay and data packet buffering hardware is significantly reduced.

An embodiment of the present disclosure provides a method for checksum calculation of a data packet comprising a plurality of digital information units including a checksum and a payload, the method comprising: (a) reading the packet unit by unit, including reading the checksum; (b) accumulating the units being read in (a) to a running sum according to a checksum calculation formula for the data packet; (c) calculating a compensation value from the running sum of (b) such that including the compensation value in the running sum validates the checksum read in (a); (d) adding an extra digital information unit in the data packet near the end of the payload; and (e) storing the dummy value in extra digital information unit.

Another embodiment of the present disclosure provides a device for checksum calculation of a data packet comprising a plurality of digital information units including a checksum and a payload, the device comprising: circuitry (a) for reading the packet unit by unit, including reading the checksum; circuitry (b) for accumulating the units being read by circuitry (a) to a running sum according to a checksum calculation formula for the data packet; circuitry (c) for calculating a compensation value from the running sum such that including the compensation value in the running sum validates the checksum read in circuitry (a); circuitry (d) for adding an extra digital information unit in the data packet near the end of the payload; and circuitry (e) for storing the dummy value in extra digital information unit.

A further embodiment of the present disclosure provides a device for checksum calculation of a data packet comprising a plurality of digital information units including a checksum and a payload, the device comprising: a processor for executing instructions stored in a non-transitory memory; the instructions comprising: instructions (a) for reading the packet unit by unit, including reading the checksum; instructions (b) for accumulating the units being read in instructions (a) to a running sum according to a checksum calculation formula for the data packet; instructions (c) for calculating a compensation value from the running sum of instructions (b) such that including the compensation value in the running sum validates the checksum read in instructions (a); instructions (d) for adding an extra digital information unit in the data packet near the end of the payload; and instructions (e) for storing the dummy value in extra digital information unit.

Where alternative embodiments and additional aspects of those embodiments are described in the present disclosure, these embodiments and aspects may be combined in any manner within a single embodiment unless the present disclosure suggests otherwise. While preferred embodiments may be illustrated or described herein, they are not intended to limit the invention. Rather, numerous changes including alternatives, modifications and equivalents may be made as would be understood by the person skilled in the art.

BRIEF DESCRIPTION OF THE DRAWINGS

Embodiments of the present disclosure are described with reference to the following figures.

DETAILED DESCRIPTION

Figure 1:
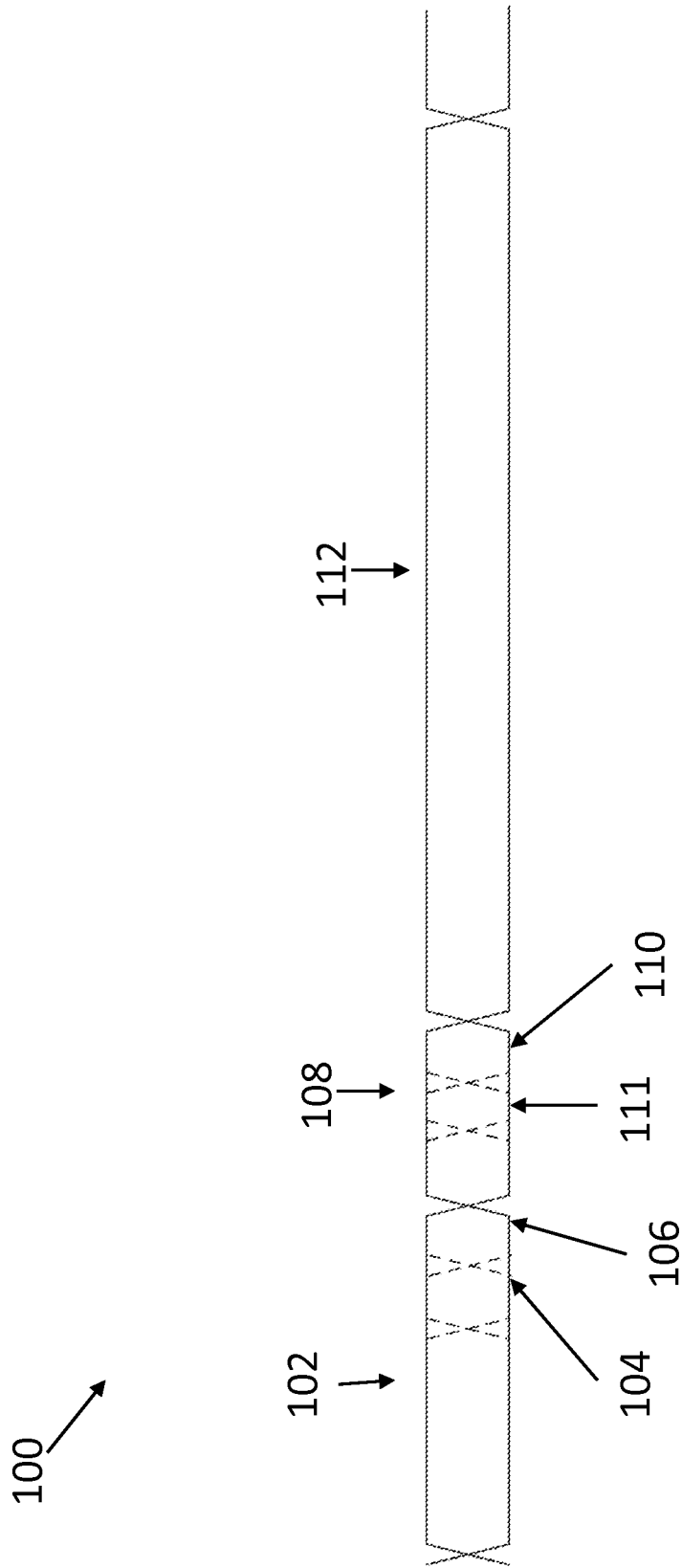
FIG. 1 is a block diagram illustrating a prior art data packet.
Figure 2:
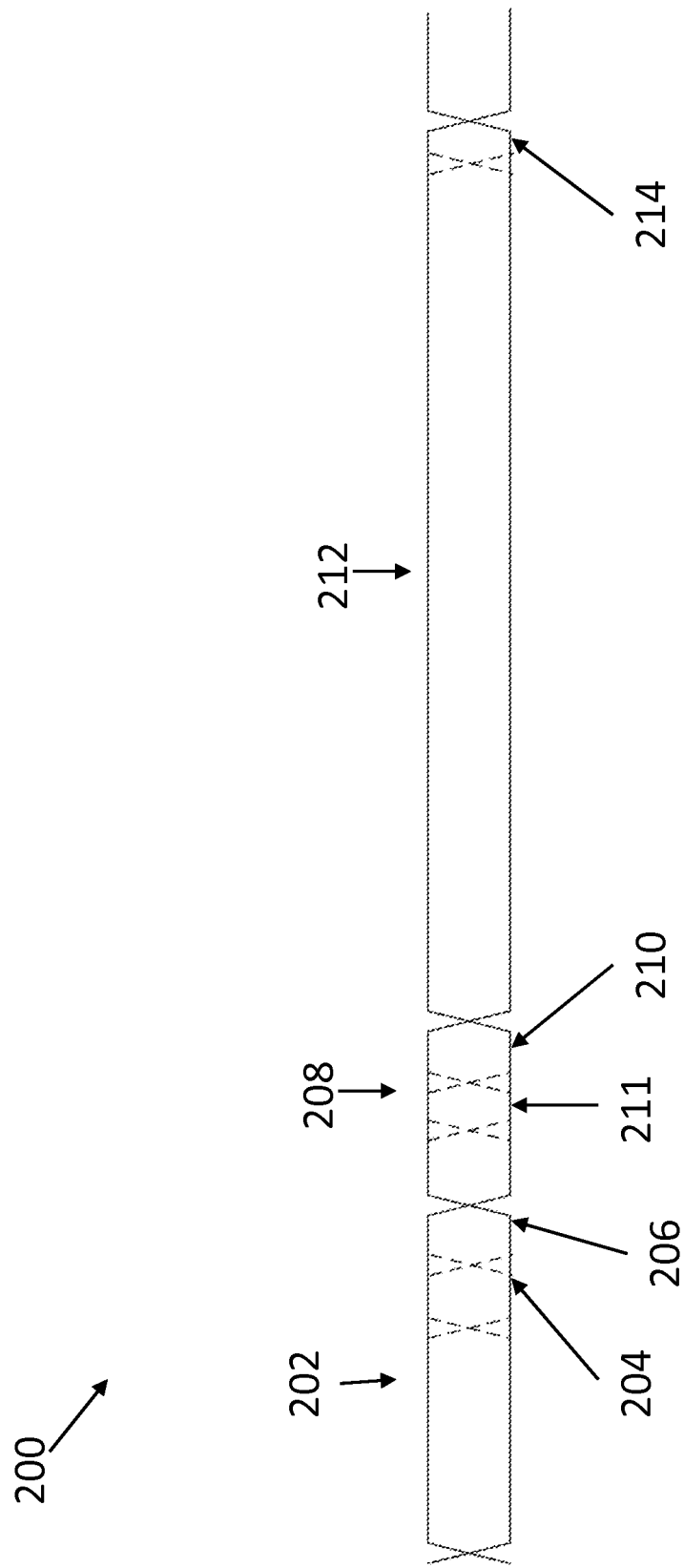
FIG. 2 is a block diagram illustrating a data packet according to the present disclosure.

In FIG. 2, a data packet 200 implementing the present invention is illustrated. Similar to the data packet 100 of FIG. 1, data packet 200 comprises an ordered series of digital information units, such as 16-bit words. Data information units can comprise any number of bits per unit, for example, one byte (8-bits), a word (16-bits), 32-bits, 64-bits any other sizes.

Data packet 200 comprises an IP header 202 including source IP address 204 and destination IP address 206; then a UDP Header 208 including a UDP checksum 210 and a length 211; and then UDP payload 212. Data packet 200 also includes a dummy compensation word 214 post-pended to the UDP payload 212. This means that the total size of the packet 200 is increased by 1 information unit and length 211 is accordingly incremented.

When processing each data packet 200 according to the present disclosure, the UDP checksum 210 is left unmodified. Instead of re-calculating a UDP checksum 110 and overwriting the old value, the given or pre-existing UDP checksum value is left unmodified in the checksum 210. To ensure the UDP checksum 210 remains valid for the whole packet 200, a dummy compensation word 214 is added in the UDP payload 212 as the last word in the packet 200 and the length 211 is incremented by one. The dummy compensation word 214 is calculated such that the conventional UDP checksum calculation on a packet 200 including the dummy compensation word 214 yields the unmodified UDP checksum 110 already in the packet 200.

By not modifying the UDP checksum 210, there is no delay awaiting calculations because the UDP checksum 210 can be immediately transmitted (for example, in word-by-word real-time processing of packets). Without a processing bottleneck at the UDP checksum 210, all of the UDP payload 212 can be immediately forwarded or transmitted instead of requiring additional temporary memory buffering so that the order of units are not disturbed. At the same time the gate count can be significantly reduce because it is no longer necessary to buffer the UDP payload 212.

Because the total packet size is increased by one when the dummy compensation word 214 is added, a new UDP length 211 must replace the previous length 211 to ensure the dummy compensation word 214 is included in the packet 200. Additional logic increments the length 211 by one when processing the packet 200 in anticipation of adding the dummy compensation word. This may add a couple of data latches, an adder and delay the packet 200 a couple of clock cycles; however this additional logic is minimal, can be accomplished in real time, and does not significantly delay processing of the packet 200. This is a significantly smaller increase in chip size and processing delay than occurs under conventional checksum calculations.

Figure 3:
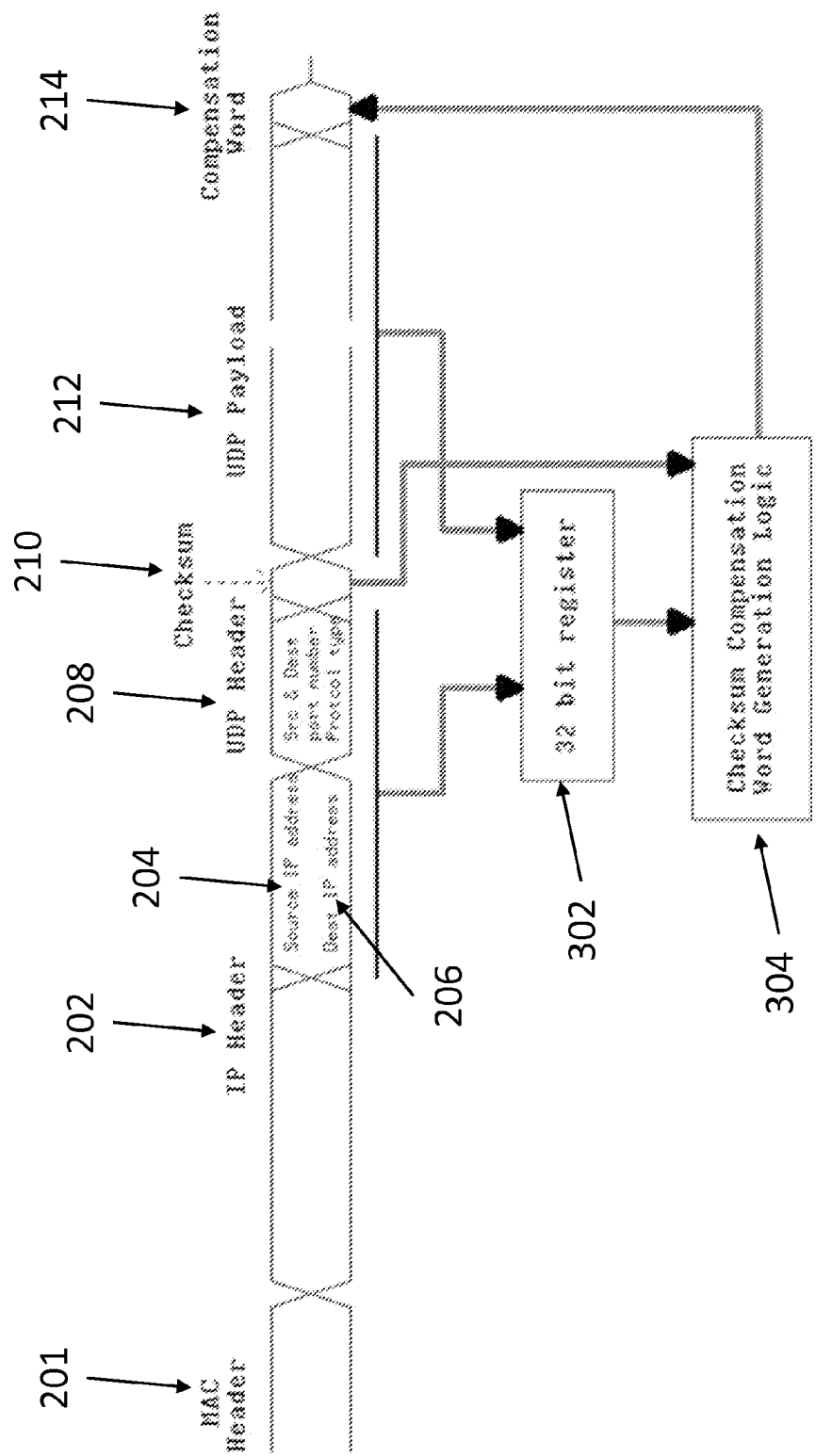
FIG. 3 is a block diagram illustrating processing of a data packet according to the present disclosure.

Calculation of the dummy compensation word 214 is now described with reference to FIG. 3. Although the UDP checksum 210 remains unchanged, a 32-bit register continues to accrue the relevant fields and the packet 200 is processed in the same manner as the 32-bit register for the conventional checksum calculation; however the value that accrues in the 32-bit register 302 is now used for calculating the dummy compensation word 214 and the length 211 is incremented by one when it is processed. In some embodiments, the register is of a size (or number of bits) that is twice the size of the digital information units being processed. The 32-bit register 302 may be implemented in any known form of hardware or software as desired.

Checksum compensation word generation logic 304 calculates the dummy compensation word 214. In some embodiments, it also stores the checksum value 210 in a temporary memory storage or buffer when it is processed. When the UDP payload 212 has been processed by the 32 bit register 302, the checksum compensation word generation logic 304 calculates the dummy compensation word 214 using the buffered, unmodified checksum 210 and the new, incremented UDP length 211. The checksum compensation word generation logic 304 may be implemented in any known form of hardware or software as desired.

The dummy compensation word 214 can be calculated by taking the two's complement of the sum of the most significant and least significant words of the 32-bit register then adding the bit inversion of the unmodified checksum 210. Expressed mathematically: Dummy Compensation Word=~(MS[16]+LS[16]−1)+~Checksum, where MS[16] is the most significant word of the 32-bit register 302, LS[16] is the least significant word of the 32-bit register 302 and the tilde operation (~) is bit inversion.

In embodiments where the digital information unit size is not 16-bits, calculating the dummy compensation word 214 involves a register of double the size of the digital information unit size, performing the same calculation by adding the top half of the register to the bottom half of the register and yielding a dummy compensation word 214 that is the same size as the digital information unit size. Instead of doubling the length 211 when accruing the register, the length is multiplied by the digital information unit size. Although dummy compensation word 214 has been described and named as a word, (implying 16-bit size), the compensation word may be any size: byte, word, double word, 64-bits or other size consistent with the size of the digital information units being processed.

By placing the dummy compensation word 214 as the last word in the packet 200, the dummy compensation word 214 is processed at the end of the UDP payload 212 which is the same time when the 32-bit register 302 has completed accruing the relevant fields from the packet 200. Accordingly, there is significantly reduced delay between completing calculation of the dummy compensation word 214 and the window when that word must be forwarded or transmitted. This eliminates the need for more gates to store the UDP payload 212 which may be several kilobytes in size and reduces a delay from thousands of clock cycles (dependent on the size of the UDP payload) to a small number of clock cycles that is independent of the UDP payload size.

The 32-bit register 302 accrues the IP source and destination addresses, 204, 206 the UDP header 208 (excluding the checksum value 210 which is buffered in the checksum compensation word generation logic 304 but adding the incremented length 211 value multiplied by the information unit size), and all of the UDP payload 212 (excluding the dummy compensation word 214 which is being calculated). After all of the relevant data units are accumulated in the 32-bit register, then checksum compensation word generation logic 302, with the buffered UDP checksum 210, calculates the dummy compensation word 214 which is attached at the end of the UDP payload 212 to make the given UDP checksum 210 on the UDP header 208 a valid UDP checksum value for packet 200. Since there was never any delay waiting for a data unit to be processed, no additional storage space is needed.

An example of the running calculation of the dummy compensation word is illustrated in Table 2. This table uses the same packet as table 1; however the UDP checksum was changed to (0xABCD), an invalid checksum value without the compensation dummy word 214, 410:

TABLE 2

| Item Name | 16-bit Input | 32-bit Register |
|---|---|---|
| MAC header | ffff | 00000011 |
|  | ffff | 00000011 |
|  | ffff | 00000011 |
|  | 0024 | 00000011 |
|  | e89d | 00000011 |
|  | 453c | 00000011 |
|  | 0800 | 00000011 |
| IPv4 header | 4500 | 00000011 |
|  | 0044 | 00000011 |
|  | bd50 | 00000011 |
|  | 0000 | 00000011 |
|  | 8011 | 00000011 |
|  | 3bd5 | 00000011 |
| IP Source address | 0a4b | 00000a5c |
|  | 3739 | 00004195 |
| IP Destination address | ffff | 00014194 |
|  | ffff | 00024193 |
| UDP header | 0405 | 00024598 |
|  | 079b | 00024d33 |
| Length + 1 | 0031 | 00024D95 |
| Checksum | ABCD | 00024D95 |
| Payload | 4e56 | 00029BEB |
|  | 3550 | 0002D13B |
|  | 5444 | 0003257F |
|  | 4158 | 000366D7 |
|  | 4141 | 0003A818 |
|  | 424e | 0003EA66 |
|  | 5355 | 00043DBB |
|  | 784d | 0004B608 |
|  | 5644 | 00050C4C |
|  | 4643 | 0005528F |
|  | 4d31 | 00059FC0 |
|  | 5a4f | 0005FA0F |
|  | 537a | 00064D89 |
|  | 4541 | 000692CA |
|  | 6233 | 0006F4FD |
|  | 4a54 | 00073F51 |
|  | 6158 | 0007A0A9 |
|  | 5242 | 0007F2EB |
|  | 6257 | 00085542 |
|  | 5541 | 0008AA83 |
| Dummy Compensation Word | A9A7 |  |

When data processing reaches the dummy word for the packet in Table 2, the 32-bit register has accumulated to 0x008aa83. The unmodified checksum value was 0xABCD. It was stored in a temporary register. The dummy word is calculated by taking the two's complement of the sum of the most significant word and the least significant word of the 32-bit register and adding the two's complement of the unmodified checksum. This calculation is illustrated mathematically in Table 3.

TABLE 3

| | |
|---|---|
| Dummy Compensation Word | = ~(0x0008 + 0xAA83 − 1) + ~(0xABCD) |
| | = ~0xAA8A + ~0xABCC |
| | = 0x5575 + 0x5432 |
| | = 0xA9A7 |

Figure 4:
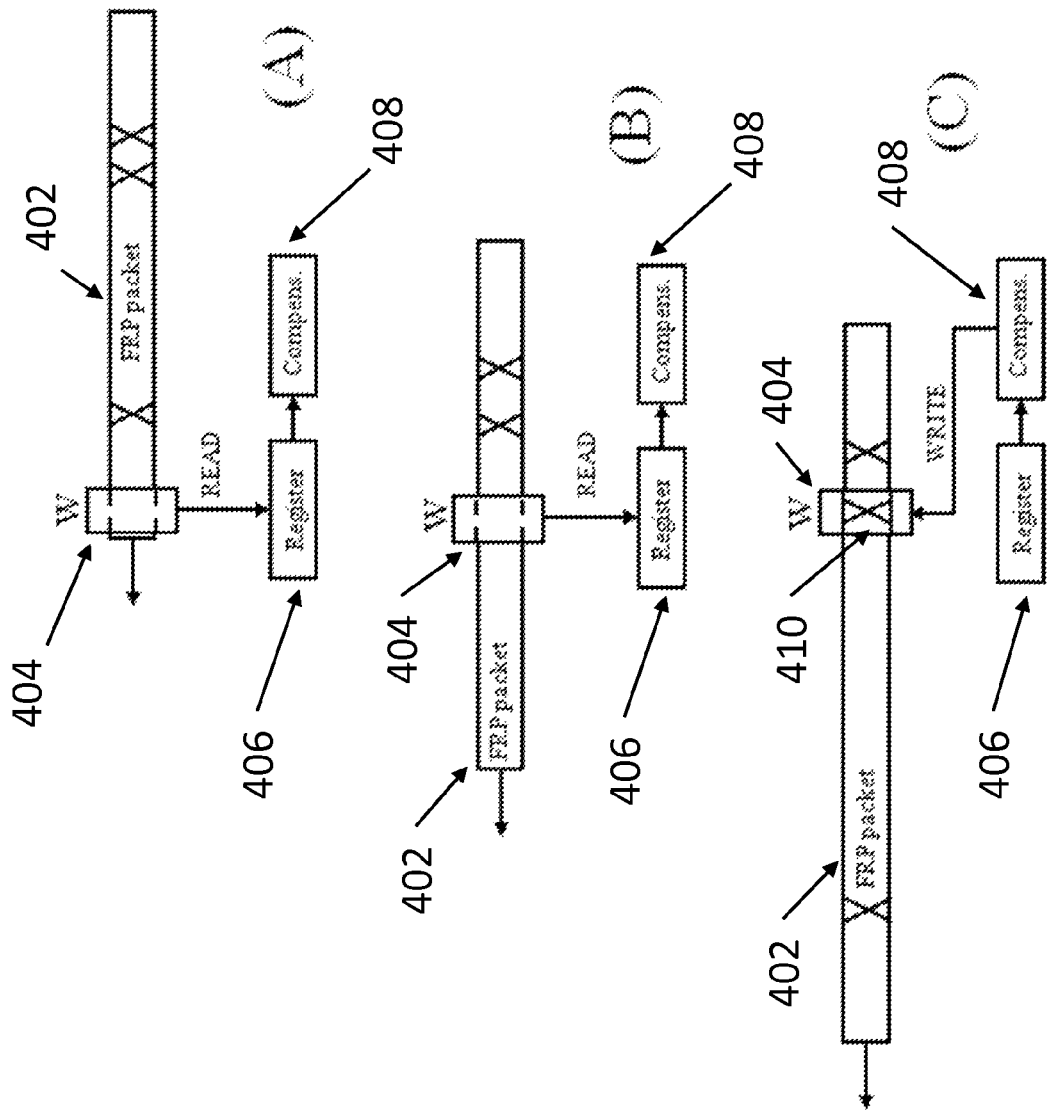
FIG. 4 illustrates in block diagrams three steps of a processing window processing a data packet according to the present disclosure.

In FIG. 4, an FRP packet 402 is processed through a window 404 in real time. The window 404 represents the current computational focus point of a computing system implementing an embodiment of the present disclosure. In FIG. 4, the window 404 processes a single digital information unit at a time. In some embodiments, the window 404 may process multiple digital information units simultaneously.

Similar to 32-bit register 302, register 406 adds words of the packet 402, e.g. FRP packet, in real time. Which digital information units of the packet 402 are accumulated and which are skipped depends on the packet being processed. In some embodiments, all units except one may be accumulated by register 406.

The packet 402 "runs" through the window 406 at steps (A) and (B). The previous checksum present in the packet 402 is separately stored in compensation logic 408. When the window 406 is at the last word of the packet (step (C)), a dummy compensation word 410 is written into the packet 402. The dummy compensation word 410 is calculated in a similar manner as described above.

At the receiver site, the compensation word 214, 410 can be used in the traditional checksum calculations to confirm the checksum 210. In some embodiment, the receiver site will know that the sender adds a dummy compensation word 214, 410 at the very end of the payload and will ignore (or remove) the word to retrieve the original payload data. Alternatively, the receiver site need not be aware there is a dummy checksum word 214, 410 in the packet 200, 402 and the dummy checksum word 214, 402 can ultimately be discarded when the payload 212 is consumed by client software receiving the packet.

Figure 5:
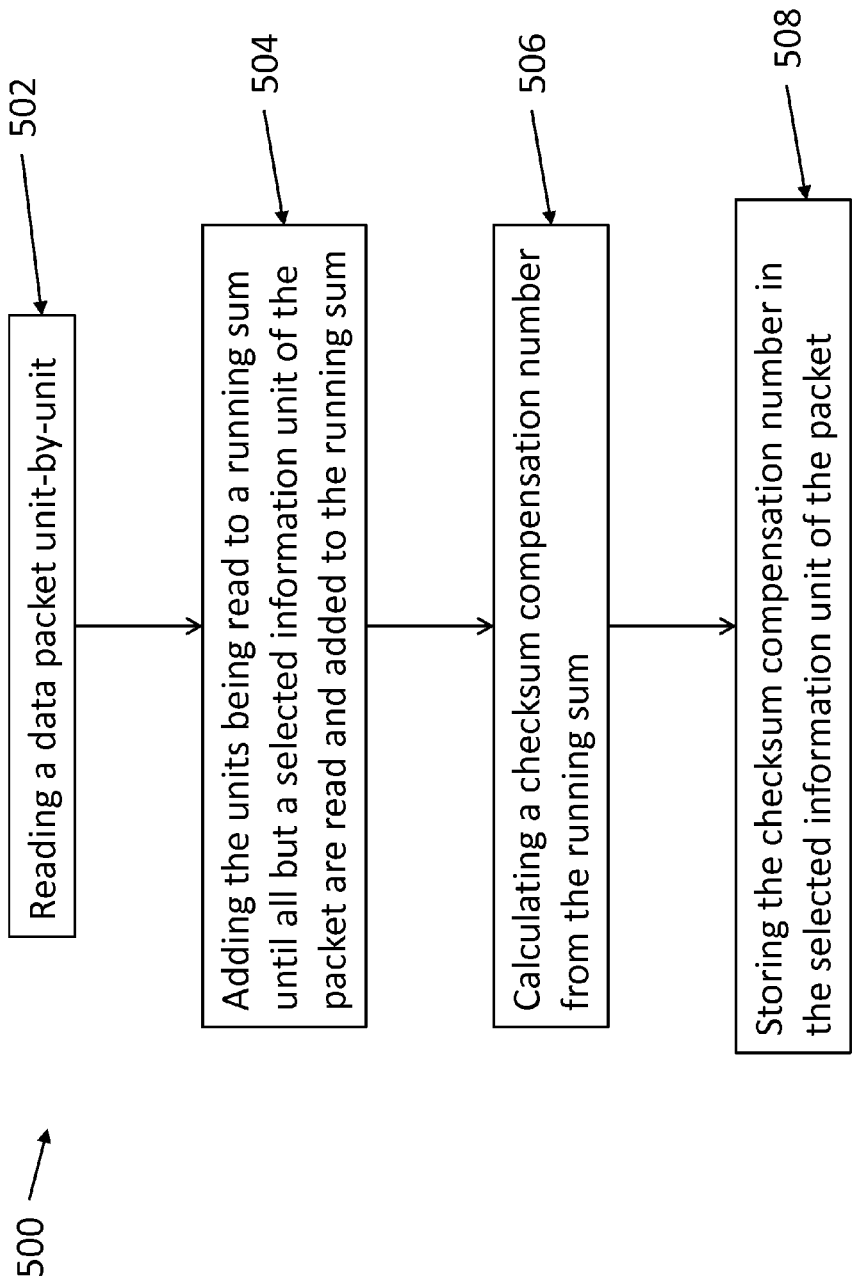
FIG. 5 is a flow chart of an example method for checksum calculation of a data packet in real time, wherein the data packet includes a header and a payload each including plurality of digital information units.

Referring now to FIG. 5, an example method 500 for checksum calculation of a data packet in real time is illustrated. The data packet includes a header and a payload each including a plurality of digital information units. At 502, the data packet is read unit-by-unit, such as through processing window 404. At 504, the units being read at 502 are added into a running sum until all but a selected information unit of the packet has been read and added to the running sum. In some embodiments, some portions are added with greater weight (such as doubling the length 211). At 506, a checksum compensation number is calculated from the running sum. In some embodiments, the data packet includes a previous checksum stored in a checksum information unit of the digital information units of the data packet, and 506 includes adding or a subtracting the previous checksum to the running sum. At 508, the checksum compensation number calculated at 506 is stored in the selected information unit of the packet. In some embodiments of method 500, the selected information unit is the last information unit of the data packet.

Figure 6:
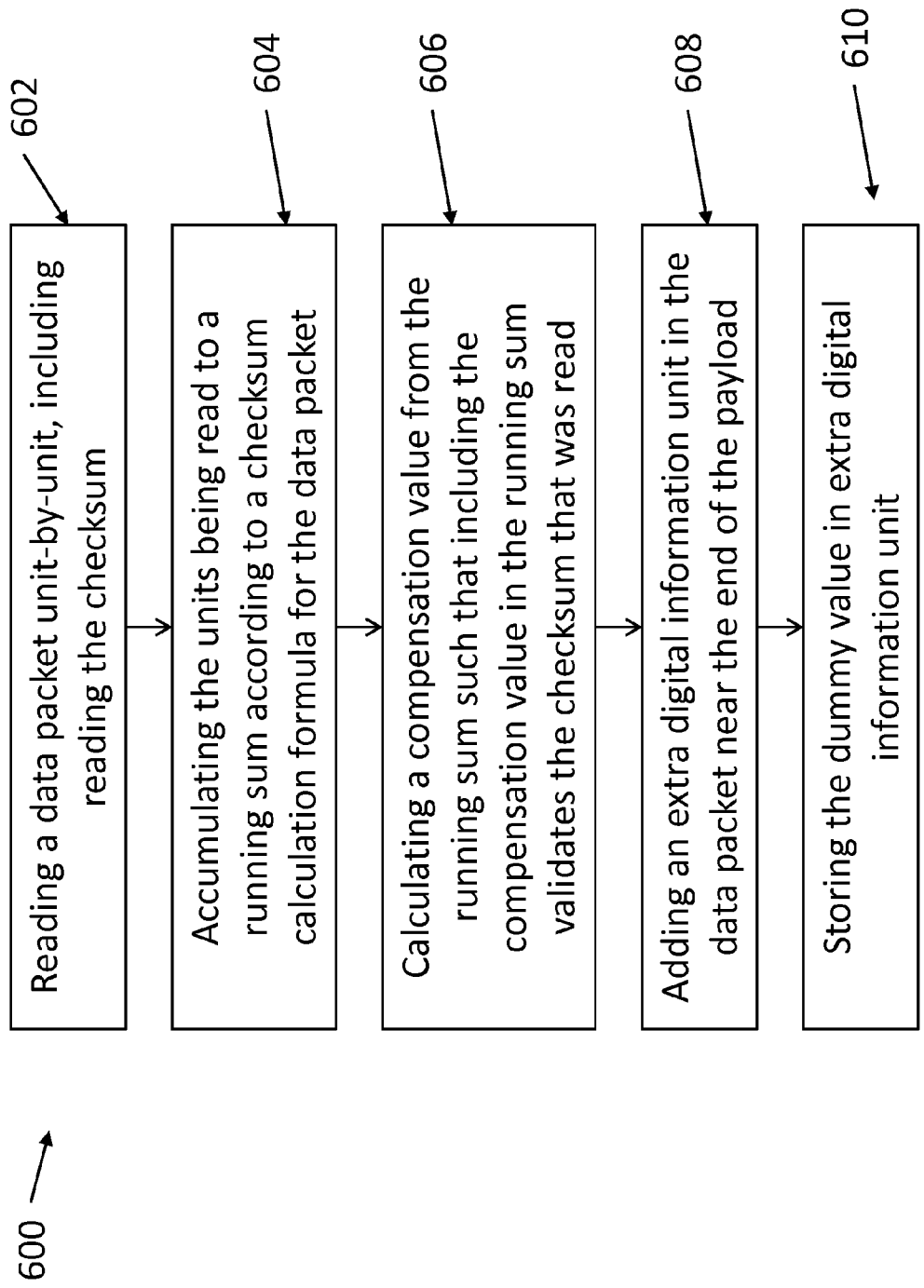
FIG. 6 is an example process diagram for dummy value calculation according to the present disclosure.

Referring now to FIG. 6, an example process diagram 600 for dummy value calculation according to the present disclosure is illustrated. This process 600 may be implemented as a method, as dependent hardware circuitry, as instructions stored in non-transitory computer executable instructions or as any combinations thereof.

Example process 600 illustrates checksum calculation of a data packet comprising a plurality of digital information units including a checksum and a payload. At 602, the method reads the packet unit by unit, including reading the checksum. Typically the packet is read sequentially, in order, from the first unit to the last unit according to the data layout of the packet illustrated in FIG. 2.

At 604, the process 600 accumulates the units being read in 602 to a running sum according to a checksum calculation formula for the data packet. The running sum is stored in a register or memory location. In some embodiments, the checksum calculation formula is selected from the group comprising a UDP packet checksum formula and an FRP packet checksum formula. The checksum calculation formula for the data packet comprises a standard, checksum calculation for the packet type, for example RFC 793 (IPv4 TCP checksum), RFC 2460 (IPv6TCP checksum), RFC 768 (IPv4 UDP checksum) and RFC 2460 (IPv6 UDP checksum). Other checksum calculation formulas (past or present) for these, or other, packet types are equally possible. In some embodiments, 604 may further comprise accumulating the running sum in a register having a most significant digital information unit and a least significant digital information unit.

At 606, the process 600 calculates a compensation value from the running sum of 604 such that including the compensation value in the running sum validates the checksum read in 602. In some embodiments, 606 may further comprise calculating the compensation value equivalent to the formula ~(MS+LS−1)+~checksum where MS is the most significant digital information unit, LS is the least significant digital information unit and ~ is the bit inversion operator.

At 608, the process 600 adds an extra digital information unit in the data packet near the end of the payload. In some embodiments, 608 may further comprise incrementing a length datum in the packet by one digital information unit prior to 604 accumulating the length datum. In some embodiments, 608 may further comprise post-pending the extra digital information unit to the payload. Where the extra digital information unit is post-pended, the process 600 may further comprise transmitting the data packet unit-by-unit in real-time.

At 610, the process 600 stores the dummy value in extra digital information unit. By storing the dummy value closer to the last unit in the payload, embodiments of the present disclosure reduce the processing delay to calculate the dummy value and approach real-time processing of the packet.

In some embodiments of the present disclosure some or all of process 600 is implemented directly in hardware circuitry such as application specific integrated circuits (ASICs), gate arrays, field programmable gate arrays (FPGAs) and other circuitry. In some embodiments, some or all of the process 600 may be implemented as instructions stored in non-transitory computer readable memory that is read and executed by a computer processor.

In some embodiments of the present disclosure, the dummy compensation word may be placed elsewhere in the UDP payload, near the end, but not as the last digital information unit in the packet. Although less than ideal, this still provides a reduction in chip size because only the portion of the UDP payload after the compensation word needs to be buffered and this still provides a reduction in processing delay because only a portion of the payload after the dummy compensation word needs to be delayed.

It will be appreciated by those skilled in the art that block diagrams herein can represent conceptual views of illustrative circuitry embodying the principles of the technology. Similarly, it will be appreciated that any flow charts, state transition diagrams, pseudocode, data format diagrams and the like represent various configurations, systems and processes which may be substantially represented in computer readable medium and so executed by a computer or processor, whether or not such computer or processor is explicitly shown.

The functions of the various elements including functional blocks labeled or described as "processors". "controllers" or "logic" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor", "controller" or "logic" should not be construed to refer exclusively to hardware capable of executing software, and may include, without limitation, digital signal processor (DSP) hardware, read only memory (ROM) for storing software, random access memory (RAM), and non-volatile storage.

When implemented in software, the functions of embodiments of the present disclosure may be stored as one or more instructions or code on a non-transitory computer-readable or processor-readable storage medium. The steps of a method, process or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The hardware used to implement the various illustrative logics, logical blocks, modules, circuitry, registers and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device. Further, the computer may be physically connected to and part of the test system, or it may be connected via such interfaces as known in the art including, for example Ethernet, Bluetooth, WiFi, USB, the Internet, etc.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program", "software" or "code" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Where example embodiments and alternatives have been described, it is understood that any number of these examples and alternatives may be combined within a single embodiment unless otherwise indicated.

I claim:

1. A method for checksum calculation of a data packet comprising a plurality of digital information units including a checksum and a payload, the method comprising:
   (a) reading the packet unit by unit, including reading the checksum;
   (b) accumulating the units being read in (a) to a running sum according to a checksum calculation formula for the data packet;
   (c) calculating a compensation value from the running sum of (b) such that including the compensation value in the running sum validates the checksum read in (a);
   (d) adding an extra digital information unit in the data packet near an end of the payload; and
   (e) storing a compensation value in the extra digital information unit.

2. The method according to claim 1 wherein (d) further comprises incrementing a length datum in the data packet by one digital information unit prior to (b) accumulating the length datum.

3. The method according to claim 1 wherein (d) further comprises post-pending the extra digital information unit to the payload.

4. The method according to claim 3 further comprising transmitting the data packet unit-by-unit in real-time.

5. The method according to claim 1 wherein (b) further comprises accumulating the running sum in a register having a most significant digital information unit and a least significant digital information unit.

6. The method according to claim 5 wherein (c) further comprises calculating the compensation value equivalent to the formula ~(MS+LS−1)+~checksum where MS is the most significant digital information unit, LS is the least significant digital information unit and ~ is a bit inversion operator.

7. The method according to claim 1 wherein the checksum calculation formula is selected from the group comprising a UDP packet checksum formula and an FRP packet checksum formula.

8. A device for checksum calculation of a data packet comprising a plurality of digital information units including a checksum and a payload, the device comprising:
   circuitry (a) for reading the packet unit by unit, including reading the checksum;
   circuitry (b) for accumulating the units being read by circuitry (a) to a running sum according to a checksum calculation formula for the data packet;
   circuitry (c) for calculating a compensation value from the running sum such that including the compensation value in the running sum validates the checksum read in circuitry (a);
   circuitry (d) for adding an extra digital information unit in the data packet near an end of the payload; and
   circuitry (e) for storing a dummy value in the extra digital information unit.

9. The device according to claim 8 wherein circuitry (d) comprises circuitry for incrementing a length datum in the data packet by one digital information unit prior to circuitry (b) accumulating the length datum.

10. The device according to claim 8 wherein circuitry (d) comprises circuitry for post-pending the extra digital information unit to the payload.

11. The device according to claim 10 further comprising circuitry for transmitting the data packet unit-by-unit in real-time.

12. The device according to claim 8 wherein circuitry (b) comprises circuitry for accumulating the running sum in a register having a most significant digital information unit and a least significant digital information unit.

13. The device according to claim 12 wherein circuitry (c) comprises circuitry for calculating the compensation value equivalent to the formula ~(MS+LS−1)+~checksum where MS is the most significant digital information unit, LS is the least significant digital information unit and ~ is a bit inversion operator.

14. The device according to claim 8 wherein the checksum calculation formula is selected from the group comprising a UDP packet checksum formula and an FRP packet checksum formula.

15. A device for checksum calculation of a data packet comprising a plurality of digital information units including a checksum and a payload, the device comprising:
   a processor for executing instructions stored in a non-transitory memory;
   the instructions comprising:
      instructions (a) for reading the packet unit by unit, including reading the checksum;
      instructions (b) for accumulating the units being read in instructions (a) to a running sum according to a checksum calculation formula for the data packet;
      instructions (c) for calculating a compensation value from the running sum of instructions (b) such that including the compensation value in the running sum validates the checksum read in instructions (a);
      instructions (d) for adding an extra digital information unit in the data packet near an end of the payload; and
      instructions (e) for storing a dummy value in the extra digital information unit.

16. The device according to claim 15 wherein instructions (d) further comprises incrementing a length datum in the data packet by one digital information unit prior to instructions (b) accumulating the length datum.

17. The device according to claim 15 wherein instructions (d) further comprises post-pending the extra digital information unit to the payload.

18. The device according to claim 17 further comprising transmitting the data packet unit-by-unit in real-time.

19. The device according to claim 15 wherein instructions (b) further comprises accumulating the running sum in a register having a most significant digital information unit and a least significant digital information unit.

20. The device according to claim 19 wherein instructions (c) further comprises calculating the compensation value equivalent to the formula ~(MS+LS−1)+~checksum where MS is the most significant digital information unit, LS is the least significant digital information unit and ~ is a bit inversion operator.

* * * * *

UNITED STATES PATENT AND TRADEMARK OFFICE
CERTIFICATE OF CORRECTION

| | | |
|---|---|---|
| PATENT NO. | : 9,281,990 B2 | Page 1 of 1 |
| APPLICATION NO. | : 13/769125 | |
| DATED | : March 8, 2016 | |
| INVENTOR(S) | : Takashi Hidai | |

It is certified that error appears in the above-identified patent and that said Letters Patent is hereby corrected as shown below:

In the Claims

Please correct Claim 1 as follows:

Column 11, line 48, change "compensation" to -- dummy --.

Signed and Sealed this
Twenty-fourth Day of May, 2016

Michelle K. Lee
*Director of the United States Patent and Trademark Office*